United States Patent
Tsukada

(10) Patent No.: US 10,863,115 B2
(45) Date of Patent: *Dec. 8, 2020

(54) GENERATION OF VISIBLE AND NEAR-INFRARED IMAGES BASED ON ESTIMATED INCIDENT LIGHT SPECTRAL CHARACTERISTICS AND IMAGE CAPTURING DEVICE SPECTRAL SENSITIVITY CHARACTERISTICS

(71) Applicant: NEC Corporation, Tokyo (JP)

(72) Inventor: Masato Tsukada, Tokyo (JP)

(73) Assignee: NEC CORPORATION, Tokyo (JP)

(*) Notice: Subject to any disclaimer, the term of this patent is extended or adjusted under 35 U.S.C. 154(b) by 76 days.

This patent is subject to a terminal disclaimer.

(21) Appl. No.: 16/311,785

(22) PCT Filed: Jun. 22, 2017

(86) PCT No.: PCT/JP2017/023073
§ 371 (c)(1),
(2) Date: Dec. 20, 2018

(87) PCT Pub. No.: WO2017/222021
PCT Pub. Date: Dec. 28, 2017

(65) Prior Publication Data
US 2019/0208146 A1  Jul. 4, 2019

(30) Foreign Application Priority Data
Jun. 24, 2016  (JP) .................. 2016-125147

(51) Int. Cl.
*H04N 5/33* (2006.01)
*H04N 9/04* (2006.01)

(52) U.S. Cl.
CPC ......... *H04N 5/332* (2013.01); *H04N 9/04515* (2018.08); *G06T 2207/10048* (2013.01)

(58) Field of Classification Search
None
See application file for complete search history.

(56) References Cited

U.S. PATENT DOCUMENTS 5,162,841 A * 11/1992 Terashita ............. G03B 27/735
                                                       355/38
6,560,358 B1 * 5/2003 Tsukada ................. H04N 1/603
                                                       358/1.9
(Continued)

FOREIGN PATENT DOCUMENTS

JP    2011-243862 A    12/2011
JP    2012-227758 A    11/2012
(Continued)

OTHER PUBLICATIONS

International Search Report for PCT Application No. PCT/JP2017/023073, dated Sep. 19, 2018.
(Continued)

*Primary Examiner* — Tyler W. Sullivan

(57) ABSTRACT

An image processing device includes an acquisition unit that acquires a color image which is imaged by an imaging unit according to incident light including visible light and near-infrared light; an estimation unit that estimates spectral characteristics of the incident light on the basis of color information about the acquired color image, spectral sensitivity characteristics of the imaging unit, and information obtained by modeling the spectral characteristics of the incident light; and a generation unit that generates a visible image and a near-infrared image on the basis of the estimated spectral characteristics of the incident light and the spectral sensitivity characteristics of the imaging unit.

8 Claims, 7 Drawing Sheets

(56) References Cited

U.S. PATENT DOCUMENTS

| | | | |
|---|---|---|---|
| 9,386,230 B1* | 7/2016 | Duran | H04N 5/2351 |
| 10,257,484 B2* | 4/2019 | Otsubo | H04N 9/735 |
| 2005/0182328 A1* | 8/2005 | Matsumoto | G01N 21/25 |
| | | | 600/476 |
| 2007/0146512 A1* | 6/2007 | Suzuki | H04N 9/083 |
| | | | 348/272 |
| 2007/0201738 A1* | 8/2007 | Toda | H04N 9/64 |
| | | | 382/144 |
| 2008/0278592 A1* | 11/2008 | Kuno | H04N 9/045 |
| | | | 348/222.1 |
| 2010/0165110 A1* | 7/2010 | Ohara | H04N 9/07 |
| | | | 348/164 |
| 2014/0169671 A1* | 6/2014 | Choi | H04N 9/67 |
| | | | 382/167 |
| 2015/0036105 A1* | 2/2015 | Ide | G01S 17/08 |
| | | | 353/31 |
| 2015/0357361 A1* | 12/2015 | Kajiyama | H01L 27/14649 |
| | | | 257/440 |
| 2016/0255286 A1 | 9/2016 | Tsukada | |
| 2017/0019614 A1 | 1/2017 | Tsukada et al. | |
| 2017/0042414 A1* | 2/2017 | Ito | A61B 1/063 |
| 2018/0188160 A1* | 7/2018 | Matsui | G01N 21/27 |
| 2019/0320126 A1* | 10/2019 | Akashi | H04N 9/07 |
| 2019/0323889 A1* | 10/2019 | Sano | G01J 3/2823 |

FOREIGN PATENT DOCUMENTS

| | | |
|---|---|---|
| WO | 2015/059897 A1 | 4/2015 |
| WO | 2015/133130 A1 | 9/2015 |
| WO | 2016/051927 A1 | 4/2016 |

OTHER PUBLICATIONS

English translation of Written opinion for PCT Application No. PCT/JP2017/023073.

* cited by examiner

GENERATION OF VISIBLE AND NEAR-INFRARED IMAGES BASED ON ESTIMATED INCIDENT LIGHT SPECTRAL CHARACTERISTICS AND IMAGE CAPTURING DEVICE SPECTRAL SENSITIVITY CHARACTERISTICS

This application is a National Stage Entry of PCT/JP2017/023073 filed on Jun. 22, 2017, which claims priority from Japanese Patent Application 2016-125147 filed on Jun. 24, 2016, the contents of all of which are incorporated herein by reference, in their entirety.

TECHNICAL FIELD

The present disclosure relates to image processing.

BACKGROUND ART

Some image sensors for capturing color images have sensitivity to near-infrared light as well as visible light, like a silicon-based sensor, for example. An image sensor with sensitivity to near-infrared light has characteristics different from human color perception, thus sometimes resulting in degradation in color reproduction.

PTL 1 discloses an image capturing device including not only a filter that transmits a visible light component, but also an infrared (IR) filter that mainly transmits an infrared light component. Further, PTL 2 discloses an image capturing device including a non-visible light sensor unit at a position farther from a side where image light enters than a visible light sensor unit.

CITATION LIST

Patent Literature

[PTL 1] Japanese Unexamined Patent Application Publication No. 2011-243862
[PTL 2] Japanese Unexamined Patent Application Publication No. 2012-227758

SUMMARY OF INVENTION

Technical Problem

The techniques disclosed in PTLs 1 and 2 both require an image capturing unit of a special configuration for capturing near-infrared light.

An exemplary object of the present disclosure is to enable a visible image and a near-infrared image to be generated with a simple configuration.

Solution to Problem

In one aspect of the invention, an image processing device is provided. The image processing device comprises acquisition means for acquiring a color image captured by image capturing means, depending on incident light including visible light and near-infrared light; estimation means for estimating spectral characteristics of the incident light, based on color information of the acquired color image, spectral sensitivity characteristics of the image capturing means, and information obtained by modeling spectral characteristics of the incident light; and generation means for generating a visible image and a near-infrared image, based on the estimated spectral characteristics of the incident light and spectral sensitivity characteristics of the image capturing means.

In another aspect of the invention, an image processing system is provided. The image processing system comprises an image capturing device and an image processing device, wherein the image capturing device comprises image capturing means for generating a color image of M channels (M is an integer equal to or larger than two), depending on incident light including visible light and near-infrared light. The image processing device comprises: acquisition means for acquiring a color image captured by the image capturing means; estimation means for estimating spectral characteristics of the incident light, based on color information of the acquired color image, spectral sensitivity characteristics of the image capturing means, and information obtained by modeling spectral characteristics of the incident light; and generation means for generating a visible image and a near-infrared image, based on the estimated spectral characteristics of the incident light and spectral sensitivity characteristics of the image capturing means.

In further another aspect of the invention, an image processing method is provided. The image processing method comprises: acquiring a color image captured by image capturing means, depending on incident light including visible light and near-infrared light; estimating spectral characteristics of the incident light, based on color information of the acquired color image, spectral sensitivity characteristics of the image capturing means, and information obtained by modeling spectral characteristics of the incident light; and generating a visible image and a near-infrared image, based on the estimated spectral characteristics of the incident light and spectral sensitivity characteristics of the image capturing means.

In further another aspect of the invention, a computer-readable program recording medium is provided. The computer-readable program recording medium records a program causing a computer to execute: a step of acquiring a color image captured by image capturing means, depending on incident light including visible light and near-infrared light; a step of estimating spectral characteristics of the incident light, based on color information of the acquired color image, spectral sensitivity characteristics of the image capturing means, and information obtained by modeling spectral characteristics of the incident light; and a step of generating a visible image and a near-infrared image, based on the estimated spectral characteristics of the incident light and spectral sensitivity characteristics of the image capturing means.

Advantageous Effects of Invention

According to the present disclosure, a visible image and a near-infrared image can be generated with a simple configuration.

EXAMPLE EMBODIMENT

First Example Embodiment

Figure 1:
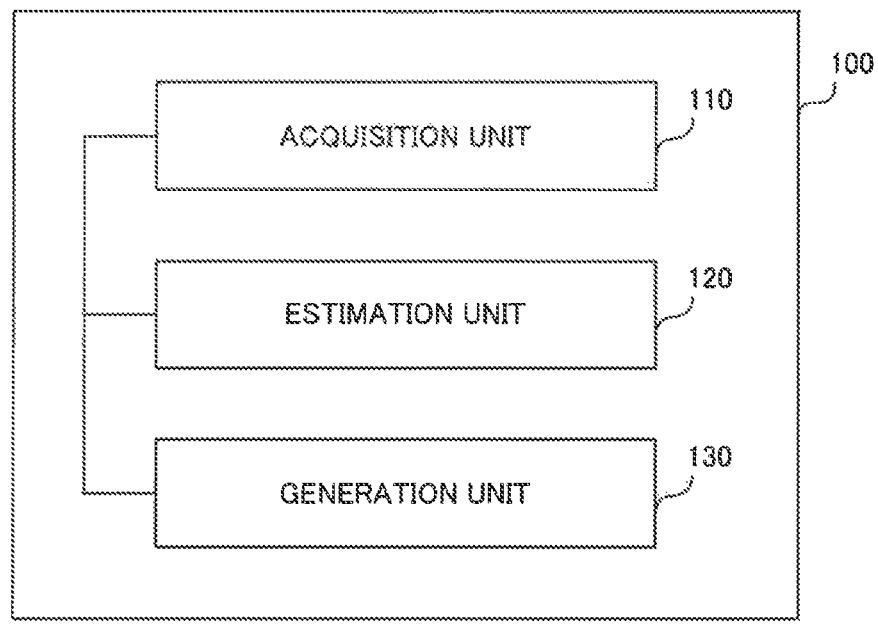
FIG. 1 is a block diagram illustrating one example of a configuration of an image processing device.

FIG. 1 is a block diagram illustrating a configuration of an image processing device 100 according to one example embodiment. The image processing device 100 is configured in such a way as to include at least an acquisition unit 110, an estimation unit 120, and a generation unit 130. The image processing device 100 may include other constituents.

The acquisition unit 110 acquires a color image. The acquisition unit 110 acquires a color image depending on incident light including visible light and near-infrared light, which is captured by an image capturing unit having sensitivity to both visible light and near-infrared light. The acquisition unit 110 may acquire a color image directly from the image capturing unit, or may acquire, from a storage medium, a color image that is captured by the image capturing unit and is then stored in the storage medium.

The visible light referred to here is light (i.e., an electromagnetic wave) in a wavelength range of approximately 400 to 700 nm, for example. Meanwhile, the near-infrared light is light in a wavelength range of approximately 0.7 to 2 μm, for example. However, upper limits and lower limits for the visible light and the near-infrared light are not necessarily limited to the wavelengths exemplified here, and may be somewhat different depending on performance and a configuration of the image capturing unit, for example.

A color image is represented by a combination of images of a plurality of channels. In other words, a color image is represented by a combination of a plurality of color components. The number of channels of a color image is not particularly limited, as long as the number is equal to or larger than two. For example, the acquisition unit 110 may be configured in such a way as to acquire a color image of three channels of red (R), green (G), and blue (B). Hereinafter, it is assumed that the number of channels of a color image is "M".

The image capturing unit is configured in such a way as to include a silicon-based sensor such as a charge coupled device (CCD) image sensor, and an optical filter (color filter) that filters incident light to the sensor, for example. The image capturing unit is configured by an image sensor in which each of image capturing elements corresponding to pixels is provided with an optical filter corresponding to one of R, G, and B, for example. Such an image sensor of the configuration including optical filters for a plurality of colors is referred to also as "a color image sensor" hereinafter.

The estimation unit 120 estimates spectral characteristics of incident light. Based on color information of an M-channel color image acquired by the acquisition unit 110, spectral sensitivity characteristics of the image capturing unit, and information obtained by modeling spectral characteristics of the incident light, the estimation unit 120 estimates spectral characteristics of incident light that is a basis of the color image acquired by the acquisition unit 110.

Here, it is assumed that a color image is represented by color components of three colors of R, G, and B. Further, it is assumed that spectral sensitivity characteristics of the color image sensor are $C_R(\lambda)$, $C_G(\lambda)$ and $C_B(\lambda)$, and spectral characteristics of incident light to a certain pixel of the color image sensor are $E(\lambda)$. Here, assuming that chrominance signals in each pixel are R, G, and B, these chrominance signals are represented as in Equation (1). Here, $\lambda$ represents a wavelength of light, and can take an arbitrary value in a wavelength range where the color image sensor has sensitivity.

$$R = \int E(\lambda)C_R(\lambda)d\lambda$$

$$G = \int E(\lambda)C_G(\lambda)d\lambda$$

$$B = \int E(\lambda)C_B(\lambda)d\lambda \qquad (1)$$

The spectral sensitivity characteristics of the color image sensor can be represented by a product of the spectral sensitivity characteristics of the image sensor and spectral transmission characteristics of the optical filter, and are known. Spectral characteristics $E(\lambda)$ of incident light are inherently continuous data that are not discrete in a wavelength. In the present example embodiment, in order to acquire, based on Equation (1), spectral characteristics $E(\lambda)$ of incident light from chrominance signals R, G, and B of an image data, modeling for representing spectral characteristics $E(\lambda)$ of the incident light by a relatively small number of parameters is introduced.

Specifically, spectral characteristics $E(\lambda)$ of incident light is modeled by a weighted sum (sum with weights) of an average vector $r_0(\lambda)$ of the incident light and a basic vector $r_i(\lambda)$. Here, the number of the basic vectors is equal to the number of colors of the optical filters, i.e., the number (M) of channels of a color image. Accordingly, the number of the basic vectors (i.e., the maximum value of i) when a color image is represented by color components of three colors of R, G, and B is "3". In the case of "M=3", spectral characteristics $E(\lambda)$ of incident light are modeled as in Equation (2).

$$E(\lambda) = r_0(\lambda) + a_1 r_1(\lambda) + a_2 r_2(\lambda) + a_3 r_3(\lambda) \qquad (2)$$

The basic vector $r_i(\lambda)$ is a function representing spectral characteristics of incident light. The basic vector $r_i(\lambda)$ is acquired by performing principal component analysis on a spectral space formed by a product of spectral characteristics of a light source and a surface reflectance of an object. According to such a basic vector $r_i(\lambda)$, spectral characteristics of incident light can be represented by a small number of parameters.

Substituting Equation (2) into Equation (1) can acquire an observation equation for an unknown parameter $a_i$ expressed in Equation (3). Here, integral constants on the right side of Equation (3) are omitted for simplicity of the description.

$$R = \int (r_0(\lambda) + \Sigma_{i=1}^{3} a_i r_i(\lambda)) C_R(\lambda) d\lambda$$

$$G = \int (r_0(\lambda) + \Sigma_{i=1}^{3} a_i r_i(\lambda)) C_G(\lambda) d\lambda$$

$$B = \int (r_0(\lambda) + \Sigma_{i=1}^{3} a_i r_i(\lambda)) C_B(\lambda) d\lambda \qquad (3)$$

The integrals of Equation (3) can be approximated to a total sum expressed in Equation (4). Here, λ1 represents a lower limit of a wavelength range of visible light. Further, λ2 represents an upper limit of a wavelength range of near-infrared light. The values λ1 and λ2 depend on the spectral sensitivity characteristics of the color image sensor.

$$R = \Sigma_{\lambda=\lambda 1}^{\lambda 2}((r_0(\lambda) + \Sigma_{i=1}^3 a_i r_i(\lambda)) C_R(\lambda))$$

$$G = \Sigma_{\lambda=\lambda 1}^{\lambda 2}((r_0(\lambda) + \Sigma_{i=1}^3 a_i r_i(\lambda)) C_G(\lambda))$$

$$B = \Sigma_{\lambda=\lambda 1}^{\lambda 2}((r_0(\lambda) + \Sigma_{i=1}^3 a_i r_i(\lambda)) C_B(\lambda)) \quad (4)$$

When color information, i.e., chrominance signals (R, G, B) of the respective color components are acquired from image data, the observation equation of Equation (4) becomes a simultaneous ternary linear equation for an unknown parameter $a_i$. Then, spectral characteristics E(λ) of incident light of each pixel can be estimated by substituting, into Equation (2), the parameter $a_i$ (i=1, 2, 3) acquired by Equation (4). Accordingly, the estimation unit 120 can acquire spectral characteristics of incident light for all pixels of the image data by solving the observation equation of Equation (4) for all the pixels.

The generation unit 130 generates a visible image and a near-infrared image. The generation unit 130 generates a visible image and a near-infrared image, based on the spectral characteristics of the incident light estimated by the estimation unit 120 and the spectral sensitivity characteristics of the image capturing unit. Specifically, the generation unit 130 generates a visible image and a near-infrared image as follows. Hereinafter, a near-infrared image is referred to also as "a near-infrared (NIR) image", depending on necessity.

For example, it is assumed that the spectral sensitivity characteristics in the visible region among the spectral sensitivity characteristics $C_R(\lambda)$, $C_G(\lambda)$, and $C_B(\lambda)$ of the color image sensor are $C_{R\_VIS}(\lambda)$, $C_{G\_VIS}(\lambda)$, and $C_{B\_VIS}(\lambda)$. Then, the chrominance signals $R_{VIS}$, $G_{VIS}$, and $B_{VIS}$ caused by visible light components are expressed by Equation (5). Here, λ3 represents an upper limit of a wavelength range of visible light (a lower limit of a wavelength range of near-infrared light). The value λ3 satisfies λ1<λ3<λ2.

$$R_{VIS} = \Sigma_{\lambda=\lambda 1}^{\lambda 3}((r_0(\lambda) + \Sigma_{i=1}^3 a_i r_i(\lambda)) C_{R\_VIS}(\lambda))$$

$$G_{VIS} = \Sigma_{\lambda=\lambda 1}^{\lambda 3}((r_0(\lambda) + \Sigma_{i=1}^3 a_i r_i(\lambda)) C_{G\_VIS}(\lambda))$$

$$B_{VIS} = \Sigma_{\lambda=\lambda 1}^{\lambda 3}((r_0(\lambda) + \Sigma_{i=1}^3 a_i r_i(\lambda)) C_{B\_VIS}(\lambda)) \quad (5)$$

By generating chrominance signals $R_{VIS}$, $G_{VIS}$, and $B_{VIS}$ for all the pixels constituting a color image, the generation unit 130 can generate image data $I_R$, $I_G$, and $I_B$ caused by the visible light components of the respective color components. The image data $I_R$, $I_G$, and $I_B$ are image data representing a visible image.

Further, by using spectral sensitivity characteristics $C_{R\_NIR}(\lambda)$, $C_{G\_NIR}(\lambda)$, and $C_{B\_NIR}(\lambda)$ in a near-infrared region out of the spectral sensitivity characteristics $C_R(\lambda)$, $C_G(\lambda)$, and $C_B(\lambda)$ of the color image sensor, the generation unit 130 acquires chrominance signals $R_{NIR}$, $G_{NIR}$, and $B_{NIR}$ caused by a near-infrared light component, by Equation (6).

$$R_{NIR} = \Sigma_{\lambda=\lambda 3}^{\lambda 2}((r_0(\lambda) + \Sigma_{i=1}^3 a_i r_i(\lambda)) C_{R\_NIR}(\lambda))$$

$$G_{NIR} = \Sigma_{\lambda=\lambda 3}^{\lambda 2}((r_0(\lambda) + \Sigma_{i=1}^3 a_i r_i(\lambda)) C_{G\_NIR}(\lambda))$$

$$B_{NIR} = \Sigma_{\lambda=\lambda 3}^{\lambda 2}((r_0(\lambda) + \Sigma_{i=1}^3 a_i r_i(\lambda)) C_{B\_NIR}(\lambda)) \quad (6)$$

The generation unit 130 generates chrominance signals $R_{NIR}$, $G_{NIR}$, and $B_{NIR}$ for all the pixels constituting a color image, adds up these signals for each of the pixels, and can thereby generate image data $I_{NIR}$ caused by a near-infrared light component. The image data $I_{NIR}$ are image data representing a near-infrared image.

Figure 2:
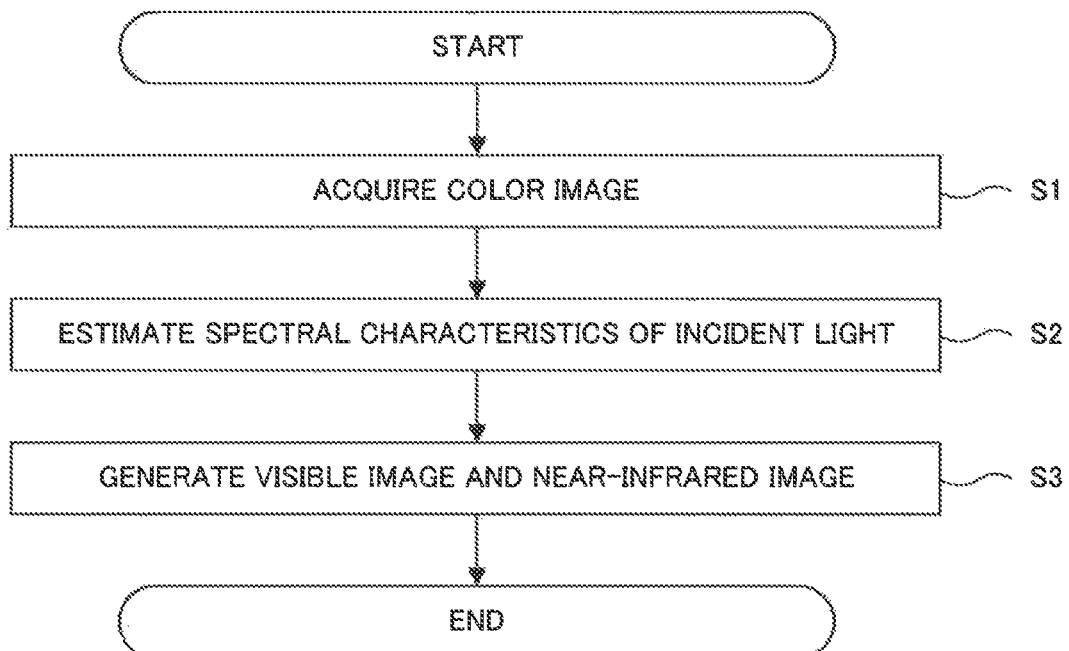
FIG. 2 is a flowchart illustrating one example of image processing performed by the image processing device.

FIG. 2 is a flowchart illustrating image processing performed by the image processing device 100. At a step S1, the acquisition unit 110 acquires an M-channel color image captured by the image capturing unit. At a step S2, the estimation unit 120 estimates spectral characteristics of the incident light, based on color information of the M-channel color image acquired at the step S1, the spectral sensitivity characteristics of the image capturing unit, and information obtained by modeling the spectral characteristics of the incident light. At a step S3, the generation unit 130 generates a visible image and a near-infrared image, based on the spectral characteristics of the incident light estimated at the step S2, and the spectral sensitivity characteristics of the image capturing unit.

As described above, the image processing device 100 according to the present example embodiment is configured in such a way as to estimate spectral characteristics of incident light, based on color information of a color image, spectral sensitivity characteristics of the image capturing unit, and information obtained by modeling spectral characteristics of the incident light. With this configuration, a visible image and a near-infrared image can be generated without including a configuration in which a visible light component and a near-infrared light component are read by separate image sensors and without including a configuration in which an optical filter is mechanically moved. Thus, without requiring such special configurations, the image processing device 100 according to the present example embodiment enables a visible image and a near-infrared image to be generated with a simple configuration.

Second Example Embodiment

Figure 3:
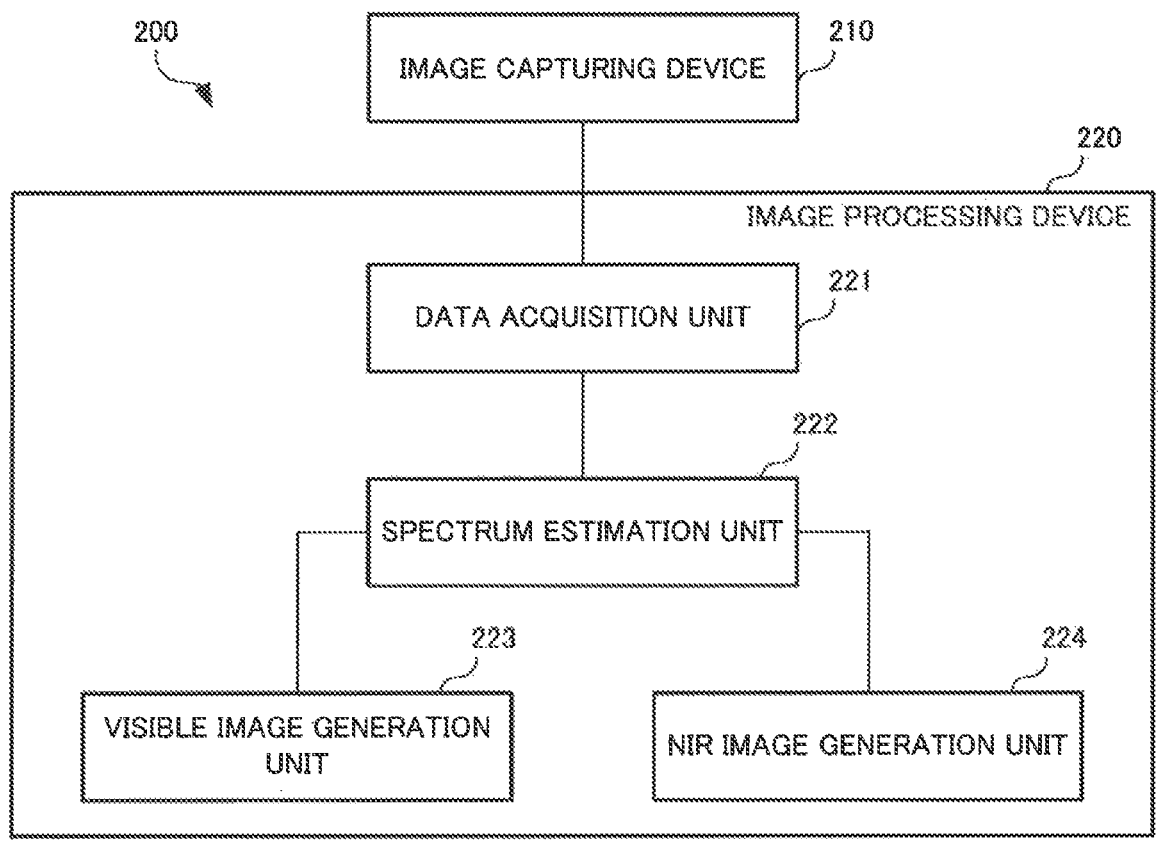
FIG. 3 is a block diagram illustrating one example of a configuration of an image processing system.

FIG. 3 is a block diagram illustrating a configuration of an image processing system 200 according to another example embodiment. The image processing system 200 is configured in such a way as to include an image capturing device 210 and an image processing device 220. The image processing system 200 may include a configuration other than the image capturing device 210 and the image processing device 220. For example, the image processing system 200 may include another device that stores, or forwards to the image processing device 220, data supplied by the image capturing device 210.

The image capturing device 210 captures an image of an object, and generates image data. In the present example embodiment, the image capturing device 210 includes a color image sensor including an image sensor and optical filters for three colors of R, G, and B. The image capturing device 210 generates image data representing a color image depending on incident light, and outputs the generated image data. This image data has spectral sensitivity in a visible region and a near-infrared region. The image capturing device 210 may be a digital still camera, for example.

The color image sensor of the image capturing device 210 is configured in such a way as to have light reception sensitivity in the near-infrared region. In other words, the optical filters of the image capturing device 210 are configured in such a way as to transmit at least a part of near-infrared light. Generally, a color image sensor sometimes includes a filter (IR cut filter) preventing transmission of near-infrared light, separately from color filters. By using a color image sensor obtained by removing an IR cut filter from such a general color image sensor, the image capturing device 210 may be configured.

Note that in the present example embodiment, visible light indicates an electromagnetic wave having a wavelength of 400 to 700 nm. Further, near-infrared light indicates an electromagnetic wave having a wavelength of 700 to 1000 nm. In other words, in the present example embodiment, λ1 is 400 nm, λ2 is 1000 nm, and λ3 is 700 nm.

Figure 4:
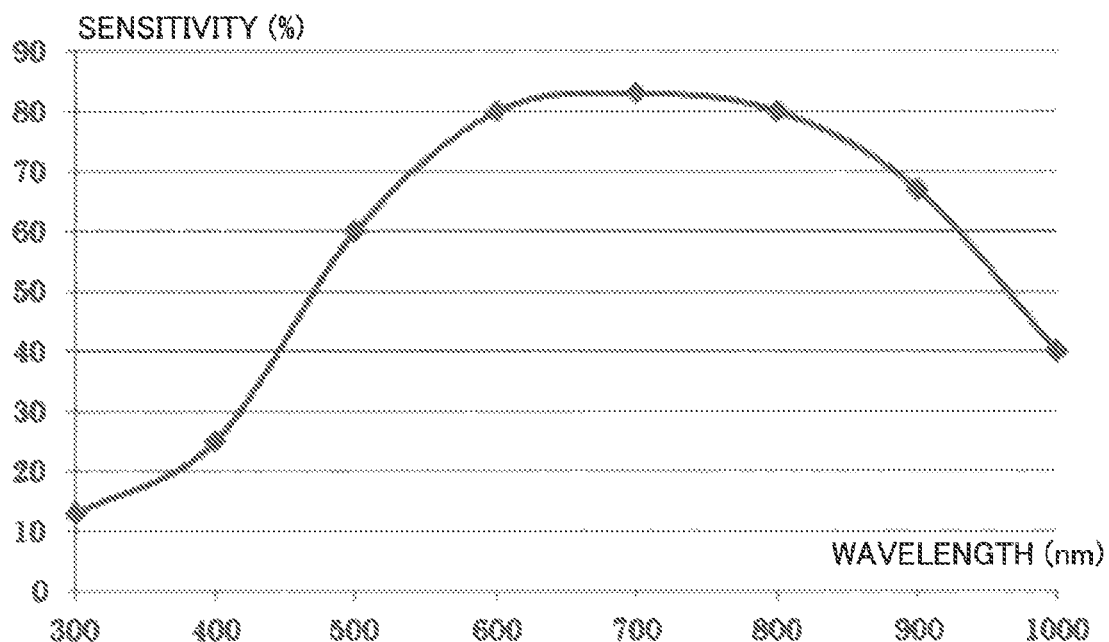
FIG. 4 is a diagram illustrating one example of spectral sensitivity characteristics of an image sensor of an image capturing device.

FIG. 4 is a diagram illustrating one example of spectral sensitivity characteristics of the image sensor of the image capturing device 210. As illustrated in FIG. 4, the image sensor of the image capturing device 210 has sensitivity to near-infrared light as well as visible light.

Figure 5:
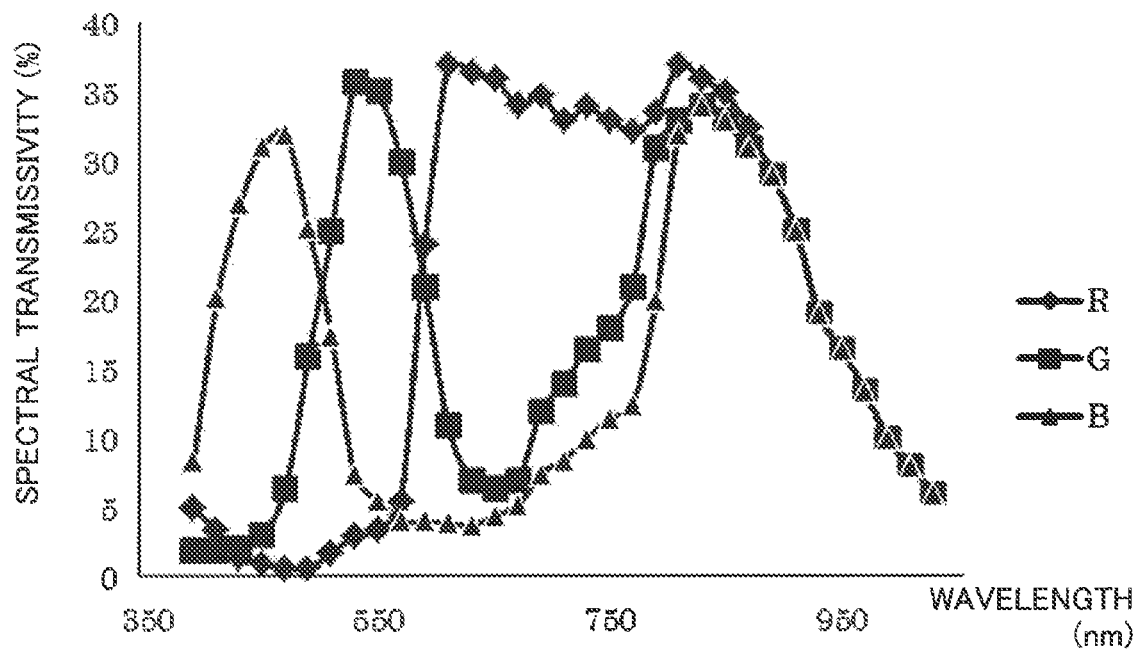
FIG. 5 is a diagram illustrating one example of spectral transmission characteristics of optical filters.

FIG. 5 is a diagram illustrating one example of spectral transmission characteristics of the optical filters of the respective colors of R, G, and B. As illustrated in FIG. 5, the optical filters of the image capturing device 210 have characteristics of transmitting near-infrared light as well as visible light. Note that it is assumed that the image sensor of the image capturing device 210 is configured in such a way that each pixel can receive light of each of the three colors of R, G, and B.

Figure 6:
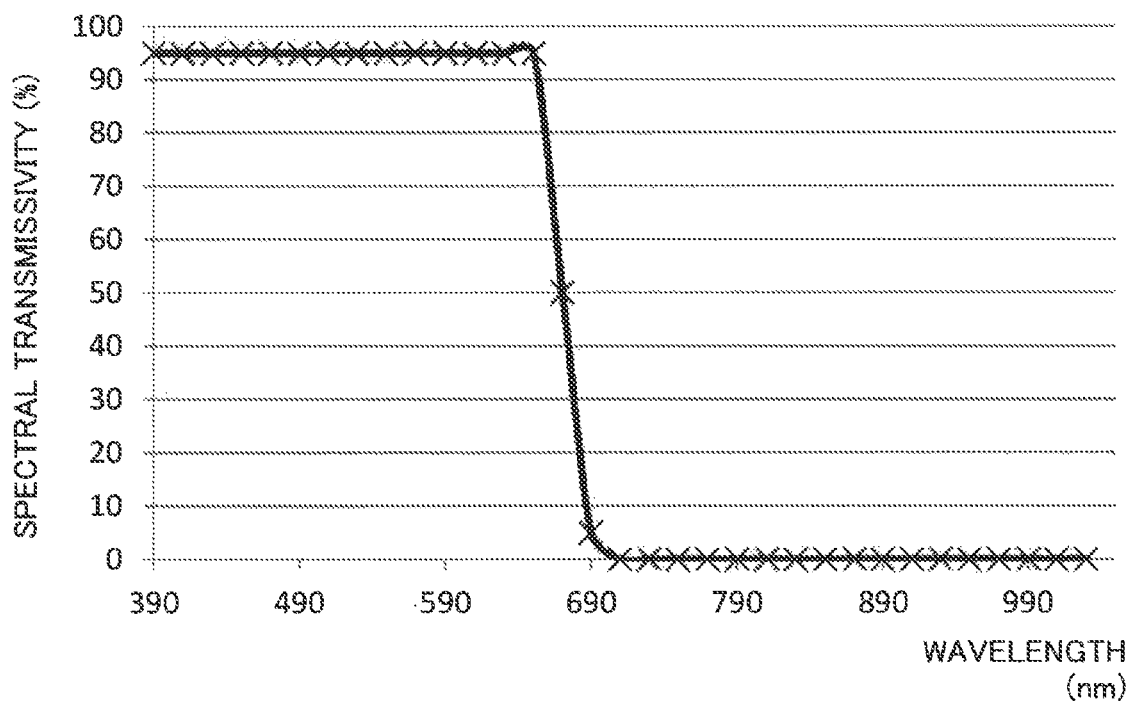
FIG. 6 is a diagram illustrating one example of spectral transmission characteristics of an IR cut filter.

FIG. 6 is a diagram illustrating one example of spectral transmission characteristics of an IR cut filter used in a general color image sensor. The general color image sensor is provided with such an IR cut filter as well as color filters, and thereby enables image capturing in which near-infrared light is cut, i.e., image capturing close to human color perception.

The image processing device 220 performs image processing on image data. Based on image data supplied from the image capturing device 210, the image processing device 220 can generate image data corresponding to a visible image and image data corresponding to a near-infrared image. The image processing device 220 is configured in such a way as to include a data acquisition unit 221, a spectrum estimation unit 222, a visible image generation unit 223, and an NIR image generation unit 224.

The data acquisition unit 221 acquires data. The data acquisition unit 221 includes a wired or wireless interface for receiving image data from the image capturing device 210, for example. Alternatively, the data acquisition unit 221 may include a reader that reads image data stored in a storage medium. The data acquisition unit 221 corresponds to one example of the acquisition unit 110 of the first example embodiment.

The data acquisition unit 221 acquires at least image data. The data acquisition unit 221 may be configured in such a way as to acquire, in addition to the image data, data (hereinafter, referred to also as "characteristic data") indicating spectral sensitivity characteristics of the image capturing device 210. Alternatively, the data acquisition unit 221 may acquire the characteristic data that are embedded as metadata in the image data or are associated with the image data.

The spectrum estimation unit 222 estimates spectral characteristics of light incident on each pixel of the color image sensor of the image capturing device 210. In the present example embodiment, the spectrum estimation unit 222 estimates a spectrum of the incident light. The spectrum estimation unit 222 estimates the spectrum of the incident light, based on the image data acquired by the data acquisition unit 221 and the characteristic data of the image capturing device 210. The spectrum estimation unit 222 corresponds to one example of the estimation unit 120 in the first example embodiment.

The visible image generation unit 223 generates first image data representing a visible image. The visible image generation unit 223 generates the first image data, based on the spectrum of the incident light estimated by the spectrum estimation unit 222 and the characteristic data of the image capturing device 210. The visible image generation unit 223 (and the NIR image generation unit 224) corresponds to one example of the generation unit 130 in the first example embodiment.

The NIR image generation unit 224 generates second image data representing a near-infrared image. The NIR image generation unit 224 generates the second image data, based on the spectrum of the incident light estimated by the spectrum estimation unit 222 and the characteristic data of the image capturing device 210.

Note that the first image data and the second image data mentioned here are distinguished merely for the sake of convenience. For example, the image processing device 220 may be configured in such a way as to output image data of four channels corresponding to the first image data (three channels) and the second image data (one channel).

The image processing system 200 is configured as described above. In principle, the image processing device 220 operates similarly to the image processing device 100 according to the first example embodiment. More specifically, the image processing device 220 performs necessary calculation under the principle described by using Equations (1) to (6), assuming that λ1 is 400 nm, λ2 is 1000 nm, and λ3 is 700 nm.

For example, based on the modeling of Equation (2), the visible image generation unit 223 calculates chrominance signals $R_{VIS}$, $G_{VIS}$, and $B_{VIS}$ caused by visible light components, by using Equation (7) as follows.

$$R_{VIS} = \Sigma_{\lambda=400}^{700}((r_0(\lambda)+\Sigma_{i=1}^{3}a_i r_i(\lambda))C_{R\_VIS}(\lambda))$$

$$G_{VIS} = \Sigma_{\lambda=400}^{700}((r_0(\lambda)+\Sigma_{i=1}^{3}a_i r_i(\lambda))C_{G\_VIS}(\lambda))$$

$$B_{VIS} = \Sigma_{\lambda=400}^{700}((r_0(\lambda)+\Sigma_{i=1}^{3}a_i r_i(\lambda))C_{B\_VIS}(\lambda)) \quad (7)$$

Further, the NIR image generation unit 224 calculates chrominance signals $R_{NIR}$, $G_{NIR}$, and $B_{NIR}$ caused by a near-infrared light component, by using Equation (8).

$$R_{NIR} = \Sigma_{\lambda=700}^{1000}((r_0(\lambda)+\Sigma_{i=1}^{3}a_i r_i(\lambda))C_{R\_NIR}(\lambda))$$

$$G_{NIR} = \Sigma_{\lambda=700}^{1000}((r_0(\lambda)+\Sigma_{i=1}^{3}a_i r_i(\lambda))C_{G\_NIR}(\lambda))$$

$$B_{NIR} = \Sigma_{\lambda=700}^{1000}((r_0(\lambda)+\Sigma_{i=1}^{3}a_i r_i(\lambda))C_{B\_NIR}(\lambda)) \quad (8)$$

Figure 7:
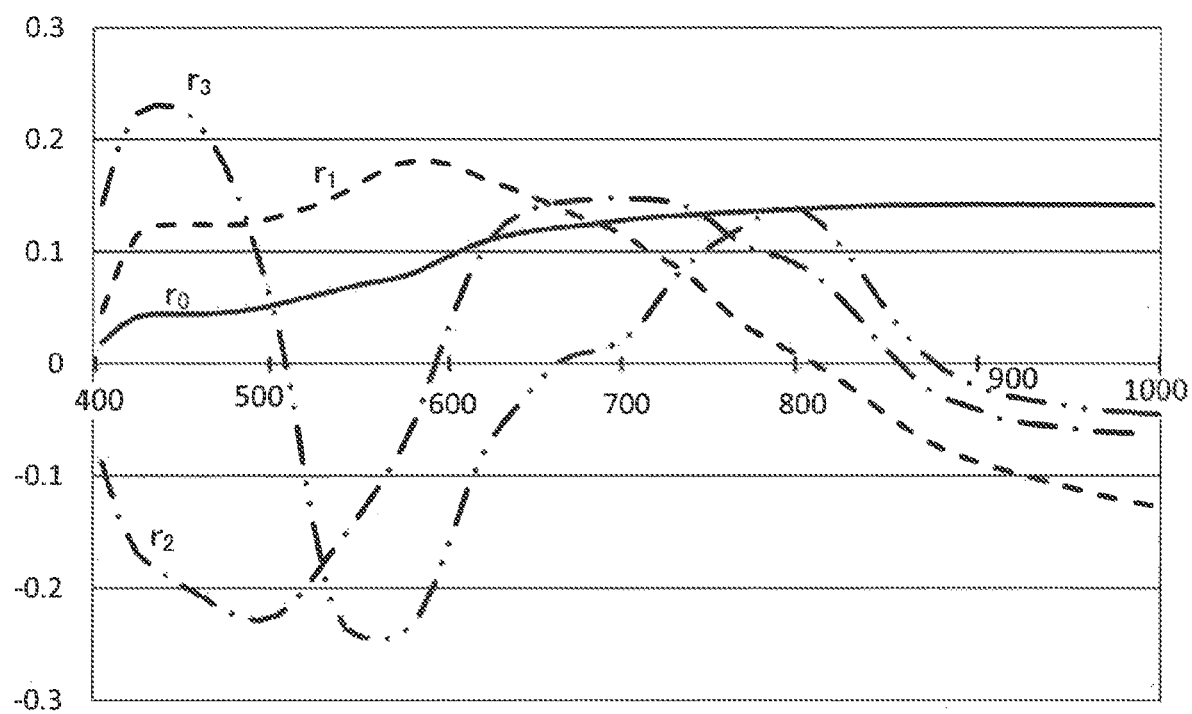
FIG. 7 is a diagram illustrating one example of an average vector $r_0(\lambda)$ and a basic vector $r_i(\lambda)$.

FIG. 7 is a diagram illustrating one example of the average vector $r_0(\lambda)$ and the basic vector $r_i(\lambda)$ in the present example embodiment. As described above, the basic vector $r_i(\lambda)$ can be acquired by performing principal component analysis on a spectral space formed by a product of spectral characteristics of a light source and a surface reflectance of an object. The image processing system 200 according to the present example embodiment includes a configuration similar to that of the image processing device 100 according to the first example embodiment. Thus, similarly to the image processing device 100, the image processing system 200 can generate a visible image and a near-infrared image with a simple configuration.

Third Example Embodiment

Figure 8:
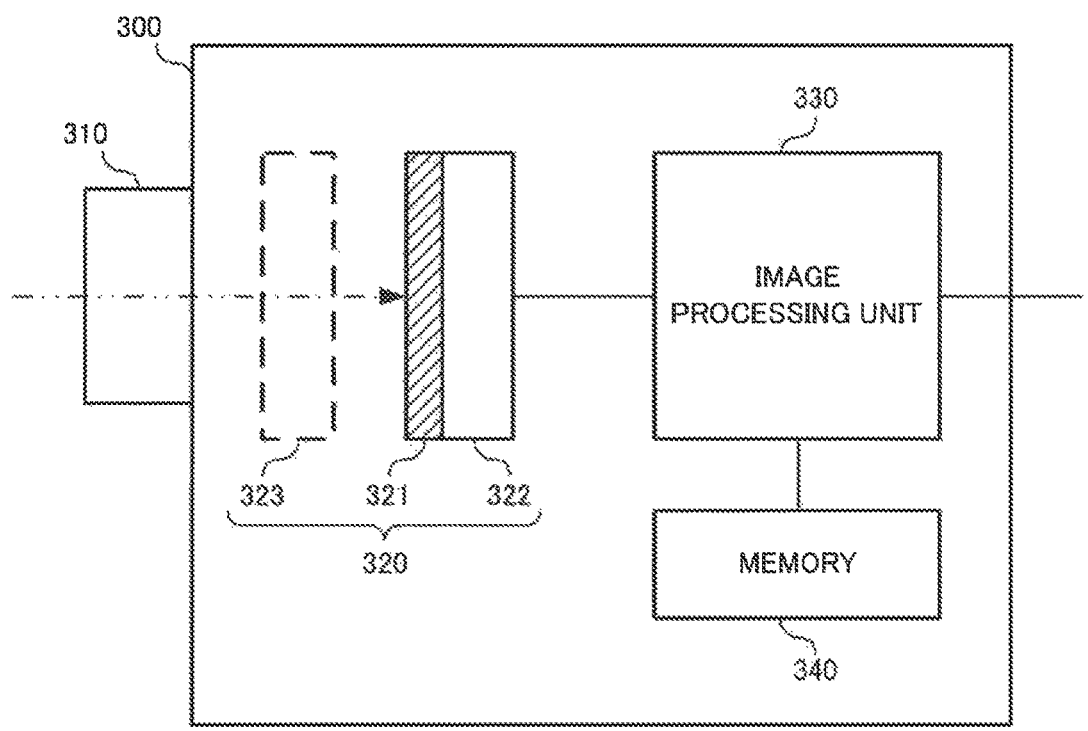
FIG. 8 is a block diagram illustrating one example of a configuration of the image capturing device.

FIG. 8 is a block diagram illustrating a configuration of an image capturing device 300 according to still another example embodiment. The image capturing device 300 is configured in such a way as to include an optical system member 310, a color image sensor 320, an image processing unit 330, and a memory 340. More specifically, the color image sensor 320 includes an optical filter 321 and a photosensor 322.

The optical system member 310 guides light to the color image sensor 320. The optical system member 310 includes a lens and a mirror, for example. The optical system member 310 causes visible light and near-infrared light to be incident on the color image sensor 320.

The color image sensor 320 generates image data depending on the incident light. The optical filter 321 is configured in such a way as to include optical filters for three colors of R, G, and B. In the optical filter 321, the optical filters for respective colors are arranged in what is called a Bayer layout. Accordingly, in the photosensor 322, each pixel selectively receives light of one of color components of the three colors of R, G, and B.

Figure 9:
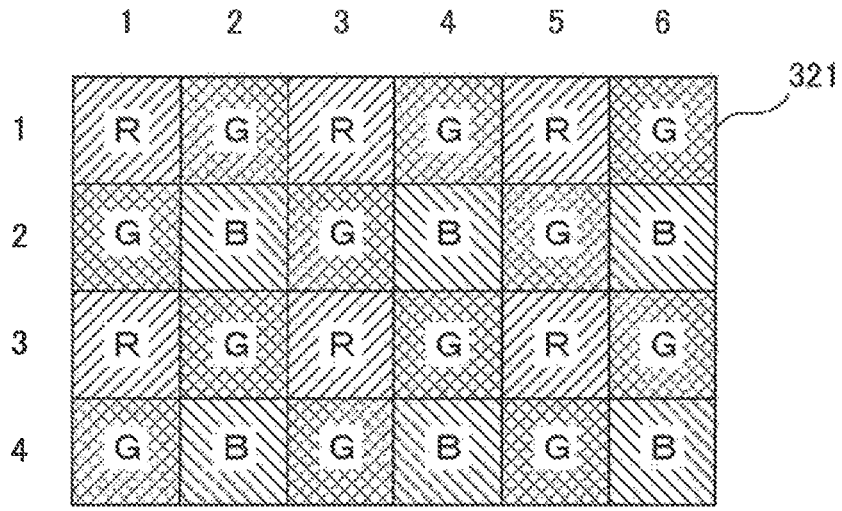
FIG. 9 is a diagram illustrating one example of a configuration of an optical filter.

FIG. 9 is a diagram illustrating one example of a configuration of the optical filter 321. In this example, color filters for red (R) are provided in correspondence with pixels at odd rows and odd columns. Meanwhile, color filters for blue (B) are provided in correspondence with pixels at even rows and even columns. Further, color filters for green (G) are provided in correspondence with pixels at the even rows and the odd columns and at the odd rows and the even columns.

When the optical filter 321 has the configuration illustrated in FIG. 9, the photosensor 322 receives, with pixels at the odd rows and the odd columns, light corresponding to red (and near-infrared light), and receives, with pixels at the even rows and the even columns, light corresponding to blue (and near-infrared light). Further, with the remaining pixels, the photosensor 322 receives light corresponding to green (and near-infrared light).

Note that a general color image sensor includes an IR cut filter 323 at a preceding stage of the optical filter 321 (i.e., between the optical system member 310 and the optical filter 321). The color image sensor 320 may have a configuration in which the IR cut filter 323 is removed from such a general color image sensor. Accordingly, the color image sensor 320 can be produced by using a general-purpose product of which mass production is easy.

The image processing unit 330 includes a configuration similar to that of the image processing device 220 according to the second example embodiment. Specifically, the image processing unit 330 includes a function of acquiring image data generated by the color image sensor 320, a function of estimating spectral characteristics of incident light, a function of generating first image data representing a visible image, and a function of generating second image data representing a near-infrared image. Further, the image processing unit 330 includes a function of performing demosaicking processing on the acquired image data. Note that wavelength ranges of visible light and near-infrared light according to the present example embodiment follow the second example embodiment. In other words, also in the present example embodiment, λ1 is 400 nm, λ2 is 1000 nm, and λ3 is 700 nm.

The memory 340 stores the characteristic data similar to those in the above-described second example embodiment. However, the characteristic data of the present example embodiment are data indicating spectral sensitivity characteristics of the image capturing device 300. The memory 340 is configured in such a way as to include a volatile or nonvolatile storage medium. This storage medium is not limited to a specific type of storage medium. The characteristic data may be measured in advance by using the image capturing device 300, or may be determined experimentally or empirically.

The configuration of the image capturing device 300 is described above. With such a configuration, the image capturing device 300 generates first image data corresponding to a visible image and second image data corresponding to a near-infrared image, based on image data depending on incident light including visible light and near-infrared light.

The optical filter 321 is in the Bayer layout, and thus, in image data input to the image processing unit 330, each pixel is composed of only a single color component. For this reason, the image processing unit 330 performs demosaicking processing. For the demosaicking processing, a plurality of algorithms are known. The image processing unit 330 performs the demosaicking processing as follows, for example. However, the demosaicking processing performed by the image processing unit 330 is not limited to a specific algorithm.

Here, with reference to FIG. 9, it is assumed that a coordinate of a pixel at an i-th row and a j-th column is (i, j). Further, it is assumed that chrominance signals of respective channels at the coordinate (i, j) are R(i, j), G(i, j), and B(i, j), respectively. For convenience of description, R(i, j), G(i, j), and B(i, j) are respectively referred to also as "an R value", "a G value", and "a B value", hereinafter.

For example, a pixel at a coordinate (1, 1) is a pixel corresponding to red. Accordingly, as expressed in Equation (9), a chrominance signal of the coordinate (1, 1) is used as an R value of the coordinate (1, 1), without change.

$$R(1,1)=R(1,1) \qquad (9)$$

Meanwhile, a G value and a B value of the coordinate (1, 1) cannot be acquired directly from the chrominance signals of the coordinate. For this reason, as expressed in Equations (10) and (11), for example, the G value and the B value of the coordinate (1, 1) are acquired by interpolation from chrominance signals of pixels of the same colors in the vicinity.

$$G(1,1) = \frac{G(1,2)+G(2,1)}{2} \qquad (10)$$

$$B(1,1) = B(2,2) \qquad (11)$$

Next, a pixel at a coordinate (1, 2) is a pixel corresponding to green. Accordingly, as expressed in Equation (12), a chrominance signal of the coordinate (1, 2) is used as a G value of the coordinate (1, 2), without change.

$$G(1,2)=G(1,2) \qquad (12)$$

Further, an R value and a B value of the coordinate (1, 2) are acquired by interpolation from chrominance signals of pixels of the same colors in the vicinity, as expressed in Equations (13) and (14), for example.

$$R(1,2)=R(1,1) \qquad (13)$$

$$B(1,2)=B(2,2) \qquad (14)$$

Similarly, the image processing unit 330 calculates R values, G values, and B values of other pixels. By calculating R values, G values, and B values of all the pixels, the image processing unit 330 can acquire color information for the three channels, for each pixel. Processing performed by the image processing unit 330 after the demosaicking processing is similar to the processing performed by the image processing device 220 according to the second example embodiment.

The image capturing device 300 according to the present example embodiment includes a configuration similar to that of the image processing device 220 according to the second example embodiment. Thus, similarly to the image processing device 220, the image capturing device 300 can generate a visible image and a near-infrared image with a simple configuration. Further, the image capturing device 300 can generate a near-infrared image with a configuration that is simpler or more inexpensive than in the case where a special configuration is required to generate a near-infrared image, and consequently, can be expected to contribute to size reduction and reliability improvement (due to less frequencies of malfunction) of the device.

Fourth Example Embodiment

Figure 10:
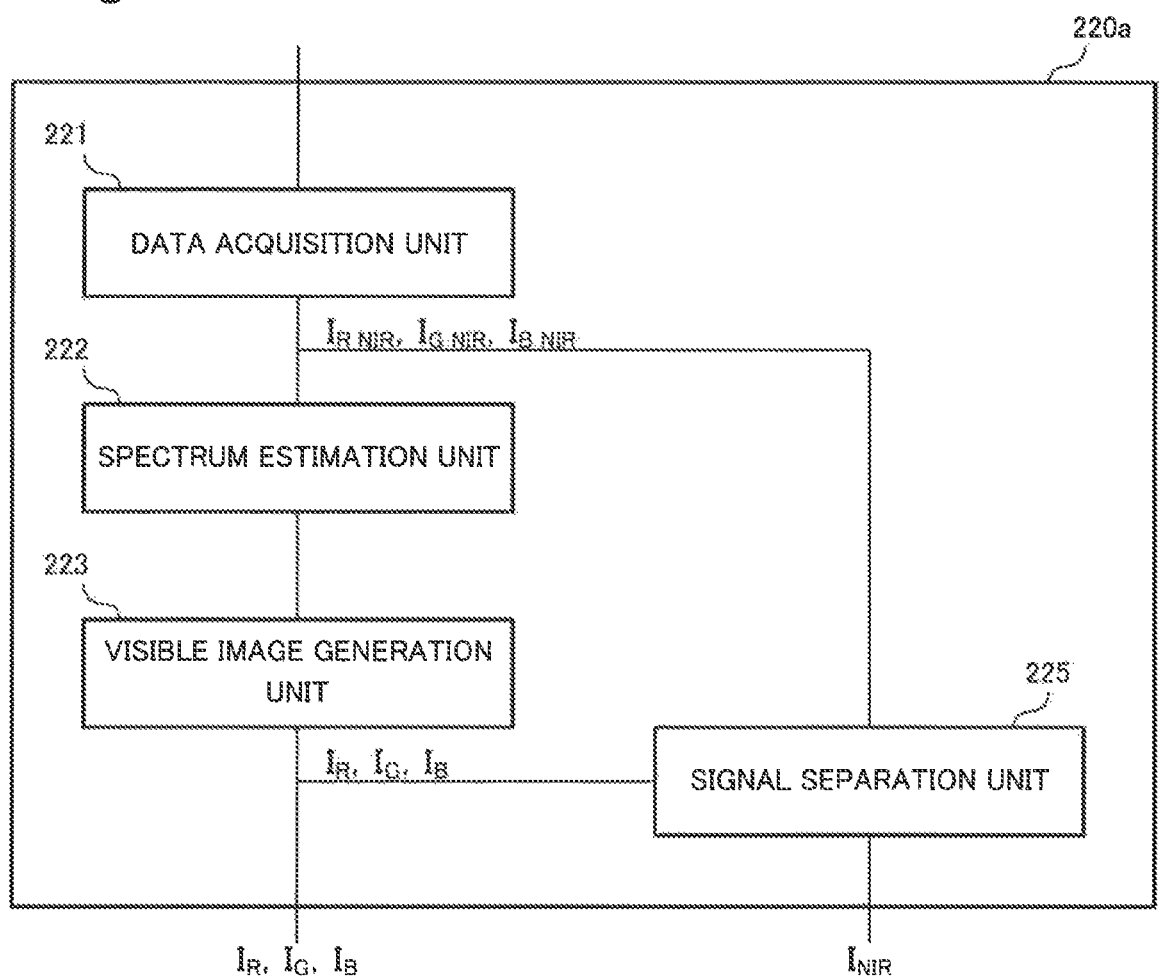
FIG. 10 is a block diagram illustrating another example of a configuration of the image processing device.

FIG. 10 is a block diagram illustrating a configuration of an image processing device 220a according to yet another example embodiment. The image processing device 220a is configured in such a way as to include a data acquisition unit 221, a spectrum estimation unit 222, and a visible image generation unit 223 similar to those of the image processing device 220 according to the second example embodiment. Further, the image processing device 220a includes a signal separation unit 225.

The signal separation unit 225 includes a function of generating a near-infrared image. Specifically, the signal separation unit 225 generates second image data, based on image data supplied by the data acquisition unit 221 and first image data generated by the visible image generation unit 223.

More specifically, the signal separation unit 225 generates second image data, based on difference between the image data supplied by the data acquisition unit 221 and the first image data. For example, assuming that image data of three channels (including a visible component and a near-infrared component) supplied by the data acquisition unit 221 are $I_{R\_NIR}$, $I_{G\_NIR}$, and $I_{B\_NIR}$, and first image data (including a visible component) are $I_R$, $I_G$, and $I_B$, the signal separation unit 225 calculates second image data $I_{NIR}$ by Equation (15). Here, $c_{R1}$, $c_{G1}$, and $c_{B1}$ are predetermined coefficients.

$$I_{NIR} = \frac{I_{R\_NIR} - I_R}{c_{R1}} + \frac{I_{G\_NIR} - I_G}{c_{G1}} + \frac{I_{B\_NIR} - I_B}{c_{B1}} \quad (15)$$

The image processing device 220a according to the present example embodiment includes a configuration similar to that of the image processing device 220 according to the second example embodiment. Accordingly, similarly to the image processing device 220, the image processing device 220a can generate a visible image and a near-infrared image with a simple configuration. Further, the image processing device 220a includes the signal separation unit 225, and thereby, can generate second image data by simple calculation such as subtraction.

Fifth Example Embodiment

Figure 11:
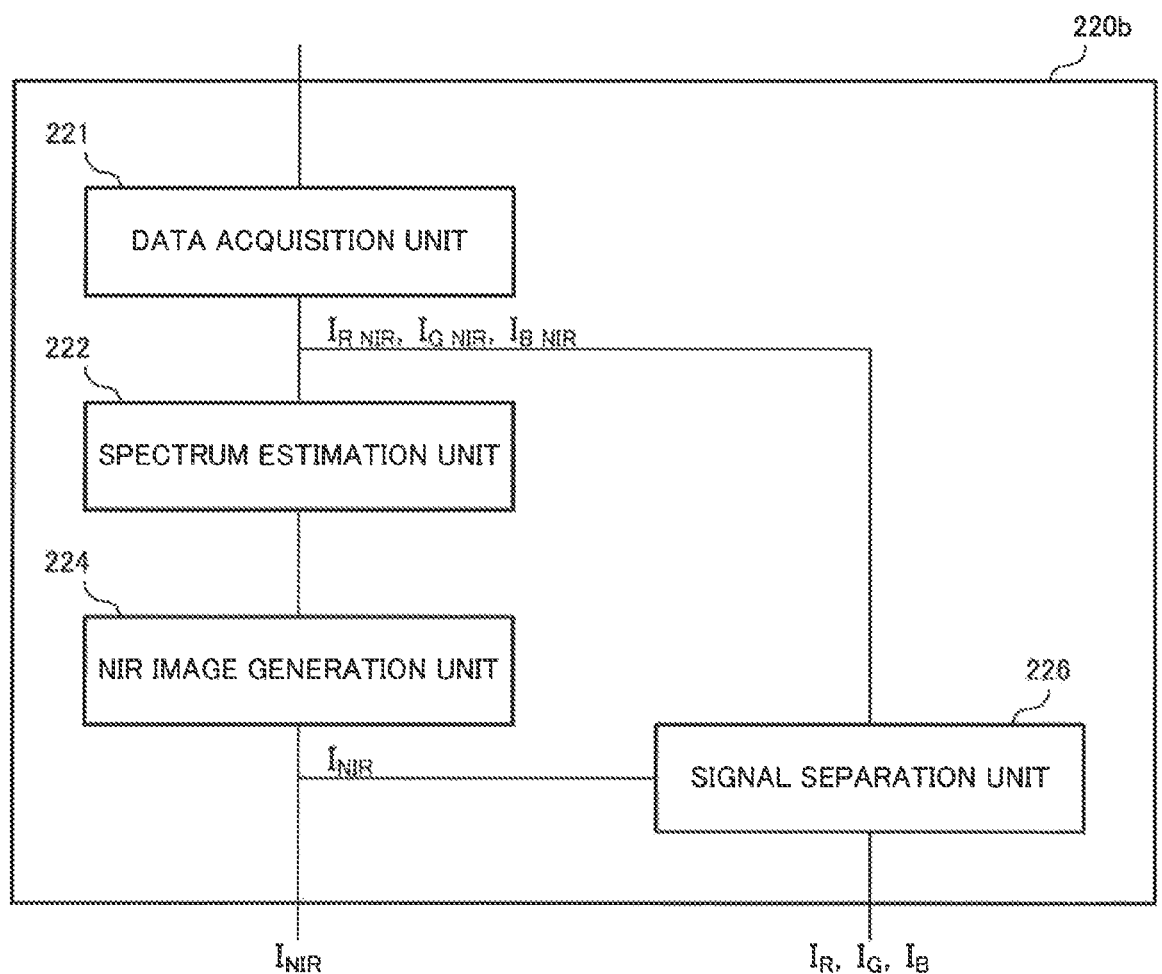
FIG. 11 is a block diagram illustrating still another example of a configuration of the image processing device.

FIG. 11 is a block diagram illustrating a configuration of an image processing device 220b according to still another example embodiment. The image processing device 220b is configured in such a way as to include a data acquisition unit 221, a spectrum estimation unit 222, and an NIR image generation unit 224 similar to those of the image processing device 220 according to the second example embodiment. Further, the image processing device 220b includes a signal separation unit 226.

The signal separation unit 226 includes a function of generating a visible image. Specifically, the signal separation unit 226 generates first image data, based on image data supplied by the data acquisition unit 221 and second image data generated by the NIR image generation unit 224.

More specifically, the signal separation unit 226 generates first image data, based on difference between the image data supplied by the data acquisition unit 221 and the second image data. For example, assuming that image data of three channels (including a visible component and a near-infrared component) supplied by the data acquisition unit 221 are $I_{R\_NIR}$, $I_{G\_NIR}$, and $I_{NIR_B NIR}$, and second image data (including a near-infrared component) are $I_{NIR}$, the signal separation unit 226 calculates first image data $I_R$, $I_G$, and $I_B$ by Equation (16). Here, $c_{R2}$, $c_{G2}$, and $c_{B2}$ are predetermined coefficients.

$$I_R = I_{R\_NIR} - \frac{I_{NIR}}{c_{R2}}$$
$$I_G = I_{G\_NIR} - \frac{I_{NIR}}{c_{G2}} \quad (16)$$
$$I_B = I_{B\_NIR} - \frac{I_{NIR}}{c_{B2}}$$

The image processing device 220b according to the present example embodiment includes a configuration similar to that of the image processing device 220 according to the second example embodiment. Accordingly, similarly to the image processing device 220, the image processing device 220b can generate a visible image and a near-infrared image with a simple configuration. Further, the image processing device 220b includes the signal separation unit 226, and thereby, can generate first image data by simple calculation such as subtraction.

Sixth Example Embodiment

Figure 12:
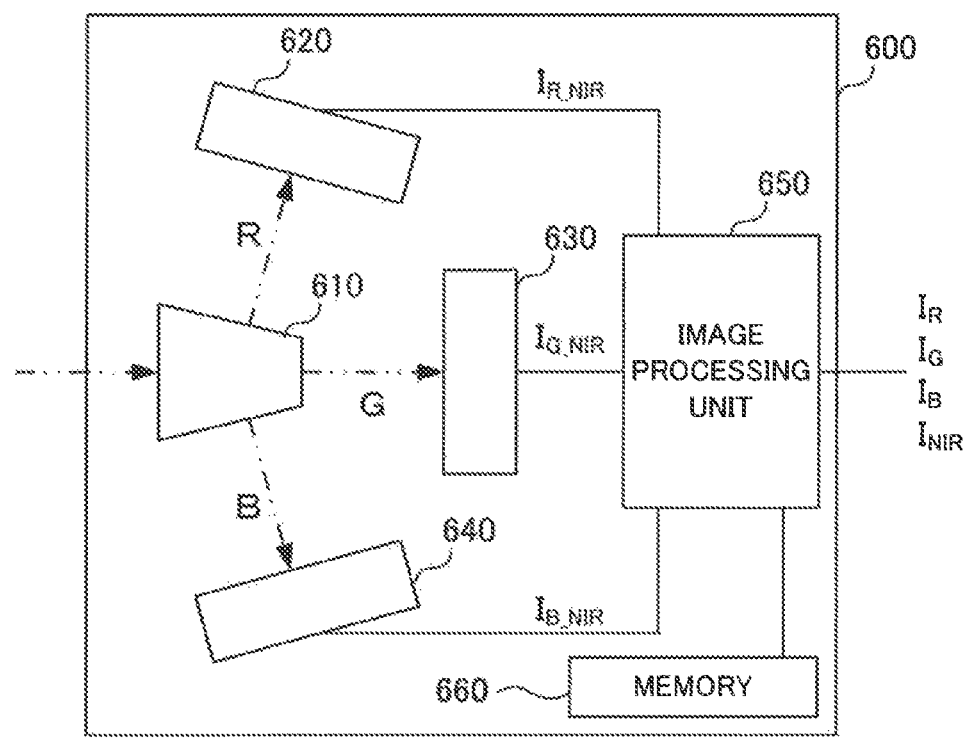
FIG. 12 is a block diagram illustrating another example of a configuration of the image capturing device.

FIG. 12 is a block diagram illustrating a configuration of an image capturing device 600 according to still another example embodiment. The image capturing device 600 is one example of an image capturing device of what is called a multi-plate type. In other words, the image capturing device according to the present disclosure is not limited to a single-plate type. The image capturing device 600 is configured in such a way as to include a color separation unit 610, photosensors 620, 630, and 640, an image processing unit 650, and a memory 660.

The color separation unit 610 disperses incident light for each specific wavelength range. The color separation unit 610 is a prism, for example. The color separation unit 610 separates incident light including a visible component and a near-infrared component, into color light components corresponding to respective wavelength ranges of R, G, and B, and emits the color light components. The color light components emitted from the color separation unit 610 are incident on the photosensors 620, 630, and 640.

The photosensors 620, 630, and 640 generate image data depending on the incident light. The photosensor 620 generates image data $I_{R\_NIR}$ corresponding to red. The photosensor 630 generates image data $I_{G\_NIR}$ corresponding to green. The photosensor 640 generates image data $I_{B\_NIR}$ corresponding to blue. At least one of these pieces of image data includes not only a visible component but also a near-infrared component.

The image processing unit 650 has a configuration similar to that of the image processing device 220 according to the second example embodiment. In other words, the image processing unit 650 includes a function of acquiring image data ($I_{R\_NIR}$, $I_{G\_NIR}$, and $I_{B\_NIR}$) generated by the photosensors 620, 630, and 640, a function of estimating spectral characteristics of incident light, a function of generating first image data ($I_R$, $I_G$, $I_B$) representing a visible image, and a function of generating second image data ($I_{NIR}$) representing a near-infrared image.

The memory 660 stores characteristic data indicating spectral sensitivity characteristics of the image capturing device 600. The memory 660 may include a configuration similar to that of the memory 340 in the third example embodiment. However, concrete values of the characteristic data can be different from values of the characteristic data in the third example embodiment.

According to the present example embodiment, similarly to other example embodiments, a visible image and a near-infrared image can be generated with a simple configuration. In terms of hardware, the image capturing device 600 can be implemented by removing an IR cut filter from a general three-plate type image capturing device. However, image processing performed by the image processing unit 650 includes processing different from image processing performed by a general three-plate type image capturing device.

Modified Example

The present disclosure is not limited to the first to sixth example embodiments described above. The present disclosure may include a form in which a modification or an application that can be understood by those skilled in the art is applied. For example, the present disclosure includes forms of below-described modified examples and forms that can be conceived from the modified examples. Further, the present disclosure may include a form in which the matters described in the present specification are appropriately combined depending on necessity. For example, the matter described by using the specific example embodiment may be applied also to the other example embodiments, to the extent that contradiction does not occur.

Modified Example 1

Both of the number of channels of a color image and a color component (i.e., a wavelength range) of each channel are not limited to specific values. For example, the number of channels of a color image may be equal to or larger than four. Further, instead of red, green, and blue, cyan, magenta, and yellow may be also used as color components of a color image.

Modified Example 2

Concrete hardware configurations of the devices (such as the image processing devices 100 and 220, and the image capturing devices 300 and 600) according to the present disclosure include various variations, and are not limited to specific configurations. For example, each of the devices may be implemented by using software, or may be configured in such a way that two or more devices are used in combination and share various kinds of processing.

Figure 13:
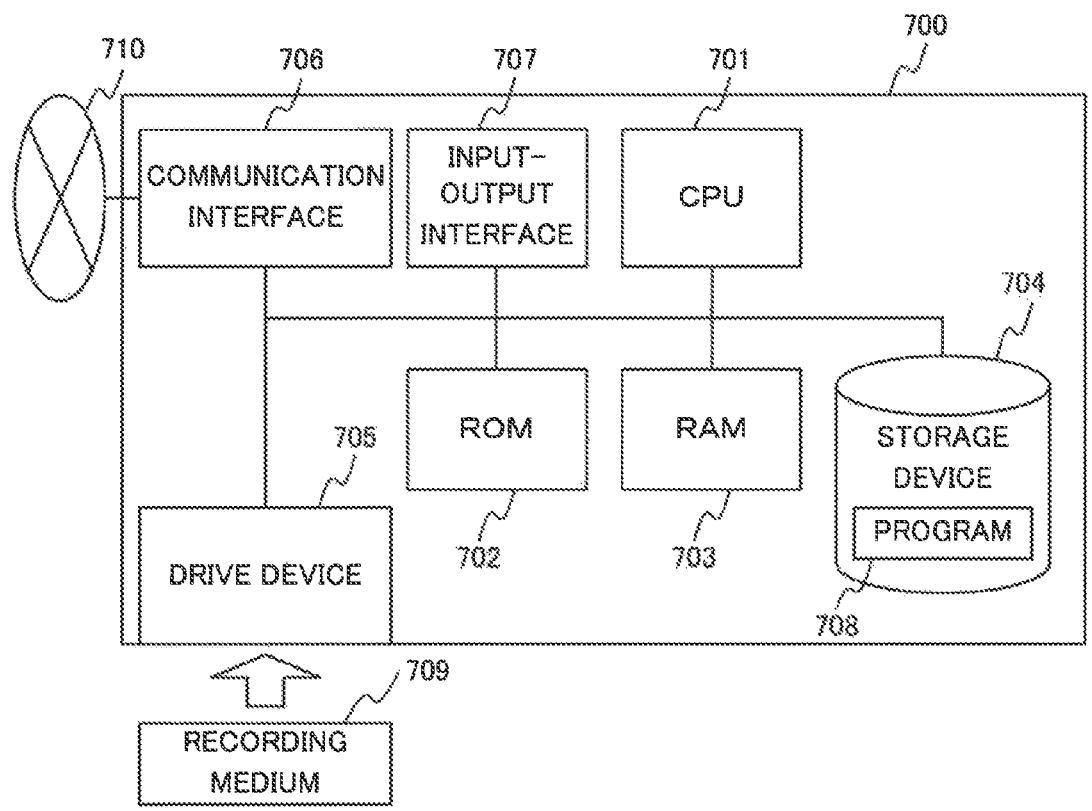
FIG. 13 is a block diagram illustrating one example of a hardware configuration of a computer device.

FIG. 13 is a block diagram illustrating one example of a hardware configuration of a computer device 700 for implementing the device according to the present disclosure. The computer device 700 is configured in such a way as to include a central processing unit (CPU) 701, a read only memory (ROM) 702, a random access memory (RAM) 703, a storage device 704, a drive device 705, a communication interface 706, and an input-output interface 707. The device according to the present disclosure can be implemented by the configuration (or a part thereof) illustrated in FIG. 13.

The CPU 701 executes a program 708 by using the RAM 703. The program 708 may be stored in the ROM 702. Alternatively, the program 708 may be recorded in a recording medium 709 such as a memory card and read by the drive device 705, or may be transmitted from an external device via a network 710. The communication interface 706 exchanges data with an external device via the network 710. The input-output interface 707 exchanges data with peripheral devices (such as an input device and a display device). The communication interface 706 and the input-output interface 707 can function as a constituent element for acquiring or outputting data.

Note that the constituent elements of the device according to the present disclosure may be configured by a single piece of circuitry (such as a processor), or may be configured by a combination of a plurality of pieces of circuitry. The circuitry mentioned here may be either dedicated or general-purpose circuitry.

The configuration described as a single device in the above-described example embodiment may be provided dispersedly in a plurality of devices. For example, each of the image processing devices 100 and 220 may be implemented by a plurality of computer devices by using a cloud computing technology or the like.

The present invention is described above by citing the above-described example embodiments as model examples. However, the present invention is not limited to the above-described example embodiments. In other words, various aspects that can be understood by those skilled in the art can be applied to the above-described example embodiments within the scope of the present invention.

This application claims priority based on Japanese patent application No. 2016-125147 filed on Jun. 24, 2016, the disclosure of which is incorporated herein in its entirety.

REFERENCE SIGNS LIST

100 Image processing device
110 Acquisition unit
120 Estimation unit
130 Generation unit
200 Image processing system
210 image capturing device
220, 220a, 220b Image processing device
221 Data acquisition unit
222 Spectrum estimation unit
223 Visible image generation unit
224 NIR image generation unit
225, 226 Signal separation unit
300, 600 Image capturing device
700 Computer device

The invention claimed is:

1. An image processing device comprising:
a memory storing therein a computer-program; and
at least one processor to access the memory and execute the computer-program to implement:
acquiring a color image captured by an image capturing device, the color image is captured depending on incident light on the image capturing device, the incident light including visible light and near-infrared light;
estimating spectral characteristics of the incident light, based on color information of the acquired color image, spectral sensitivity characteristics of the image capturing device, and information that the spectral characteristics of the incident light is modeled; and
generating a visible image and a near-infrared image, based on the estimated spectral characteristics of the incident light and the spectral sensitivity characteristics of the image capturing device, wherein
the color image is a color image of M channels (M is an integer equal to or larger than two), and
the information that the spectral characteristics of the incident light is modeled is information obtained by modeling the spectral characteristic of the incident light by an average vector of incident light and M basic vectors.

2. The image processing device according to claim 1, wherein
the at least one processor generates the visible image, based on the estimated spectral characteristics of the incident light and spectral sensitivity characteristics of the image capturing device, and generates the near-infrared image, based on the color image and the generated visible image.

3. The image processing device according to claim 2, wherein
the at least one processor generates the near-infrared image, based on a difference between the color image and the generated visible image.

4. The image processing device according to claim 1, wherein
the at least one processor generates the near-infrared image, based on the estimated spectral characteristics of the incident light and spectral sensitivity characteristics of the image capturing device, and generates the visible image, based on the color image and the generated near-infrared image.

5. The image processing device according to claim 4, wherein
the at least one processor generates the visible image, based on a difference between the color image and the generated near-infrared image.

6. The image processing device according to claim 1, wherein
the M is three, and
the color image is constituted of color components of three colors that are red, green, and blue.

7. An image processing method comprising:
acquiring a color image captured by image capturing device, the color image is captured depending on incident light on the image capturing device, the incident light including visible light and near-infrared light;
estimating spectral characteristics of the incident light, based on color information of the acquired color image, spectral sensitivity characteristics of the image capturing device, and information that the spectral characteristics of the incident light is modeled; and
generating a visible image and a near-infrared image, based on the estimated spectral characteristics of the incident light and the spectral sensitivity characteristics of the image capturing device, wherein
the color image is a color image of M channels (M is an integer equal to or larger than two), and
the information that the spectral characteristics of the incident light is modeled is information obtained by modeling the spectral characteristic of the incident light by an average vector of incident light and M basic vectors.

8. A non-transitory computer-readable program recording medium that records a program causing a computer to execute:
a step of acquiring a color image captured by image capturing device, the color image is captured depending on incident light on the image capturing device, the incident light including visible light and near-infrared light;
a step of estimating spectral characteristics of the incident light, based on color information of the acquired color image, spectral sensitivity characteristics of the image capturing device, and information that the spectral characteristics of the incident light is modeled; and
a step of generating a visible image and a near-infrared image, based on the estimated spectral characteristics of the incident light and spectral sensitivity characteristics of the image capturing device, wherein
the color image is a color image of M channels (M is an integer equal to or larger than two), and
the information that the spectral characteristics of the incident light is modeled is information obtained by modeling the spectral characteristic of the incident light by an average vector of incident light and M basic vectors.

* * * * *